United States Patent
Fukuta (10) Patent No.: US 8,412,412 B2
(45) Date of Patent: Apr. 2, 2013

(54) VEHICLE COMMUNICATION SYSTEM AND ELECTRONIC CONTROL UNIT

(75) Inventor: Kenji Fukuta, Chita-gun (JP)

(73) Assignee: Denso Corporation, Kariya (JP)

( * ) Notice: Subject to any disclaimer, the term of this patent is extended or adjusted under 35 U.S.C. 154(b) by 231 days.

(21) Appl. No.: 13/069,682

(22) Filed: Mar. 23, 2011

(65) Prior Publication Data
US 2011/0238262 A1   Sep. 29, 2011

(30) Foreign Application Priority Data

Mar. 25, 2010   (JP) .................................. 2010-70066

(51) Int. Cl.
G06F 11/00   (2006.01)
(52) U.S. Cl. ....................................................... 701/36
(58) Field of Classification Search .................... 701/29; 714/47; 709/201
See application file for complete search history.

(56) References Cited

U.S. PATENT DOCUMENTS

| | | | | |
|---|---|---|---|---|
| 5,349,673 A * | 9/1994 | Yasuda | .......................... | 709/211 |
| 5,506,773 A * | 4/1996 | Takaba et al. | ................. | 701/33.4 |
| 6,199,174 B1 * | 3/2001 | Norizuki et al. | ............... | 714/4.2 |
| 6,226,760 B1 * | 5/2001 | Burkhardt et al. | .............. | 714/33 |
| 6,253,335 B1 * | 6/2001 | Nakajima et al. | ................ | 714/15 |
| 6,282,572 B1 * | 8/2001 | Dahlin et al. | .................. | 709/228 |
| 6,473,839 B1 * | 10/2002 | Kremser et al. | .............. | 711/154 |
| 7,689,871 B2 * | 3/2010 | Hagman | ....................... | 714/47.1 |
| 7,788,005 B2 * | 8/2010 | Enomoto et al. | ............. | 701/29.6 |
| 7,801,963 B2 * | 9/2010 | von Schwertfuehrer | ..... | 709/208 |
| 2007/0198874 A1 | 8/2007 | Watanabe | | |
| 2009/0076681 A1 * | 3/2009 | Yasue et al. | ...................... | 701/35 |

FOREIGN PATENT DOCUMENTS

| | | |
|---|---|---|
| JP | 07-020007 | 1/1995 |
| JP | 2002-044101 | 2/2002 |

\* cited by examiner

*Primary Examiner* — Thomas Tarcza
*Assistant Examiner* — Alex C Dunn
(74) *Attorney, Agent, or Firm* — Nixon & Vanderhye PC (57) ABSTRACT

A vehicle communication system including a master ECU and multiple slave ECUs is disclosed. Each slave ECU initializes its storage medium if an abnormality occurs in the storage medium, and transmits a stored vehicle common information element. Some of the multiple slave ECUs are volatile memory slave ECUs in which the storage medium is a volatile memory. If the master ECU receives the common information elements from all of the volatile memory slave ECUs, and if at least one but not all of the received common information elements has an initialized initial value, the master ECU determines that a memory abnormality has occurred in the storage medium of the volatile memory slave ECU in which the common information element has the initialized initial value.

5 Claims, 8 Drawing Sheets

| TIME | ECU | CAUSE OF INITIALIZATION | |
|------|-----|-------------------------|---|
| ○○○○ | ECU1 | MEMORY ABNORMALITY | ~G1 |
| △△△△ | – | BATTERY DETACHMENT | ~G2 |
| □□□□ | ECU2 | ECU REPLACEMENT | ~G3 |
| ⋮ | ⋮ | ⋮ | |

VEHICLE COMMUNICATION SYSTEM AND ELECTRONIC CONTROL UNIT

CROSS REFERENCE TO RELATED APPLICATION

The present application is based on and claims priority to Japanese Patent Application No. 2010-70066 filed on Mar. 25, 2010, disclosure of which is incorporated herein by reference.

BACKGROUND OF THE INVENTION

1. Field of the Invention

The present invention relates to a vehicle communication system in which multiple electronic control units mounted to a vehicle are connected with each other via a network to enable data transmission therebetween.

2. Description of Related Art

Some electronic control units (ECU) mounted to a vehicle include a volatile memory, which maintains data by being powered from a battery mounted to the vehicle. The ECU may determine, by mirror check or the like, whether an abnormality occurs in the volatile memory. If it is determined that the abnormality occurs in the volatile memory, the ECU initializes the data stored in the volatile memory, and records a memory initialization code indicating the initialization of the volatile memory. For this technique, see Patent Document 1 for example.

In the above way, reliability of the data stored in the volatile memory can be checked based on whether the memory initialization code is stored. More specifically, if the memory initialization code is stored, it can be determined that there is a question about reliability of the data stored in the volatile memory because the abnormality had occurred in the volatile memory storing the data. By contrast, if the memory initialization code is not stored, it can be determined that the stored data is reliable because the abnormality has not occurred in the volatile memory storing the data.

For example, when vehicle diagnosis information is stored in the volatile memory, it is possible to check the reliability of the stored vehicle diagnosis information based on whether or not the memory initialization code is stored. Thus, it is possible to suppress an occurrence of the following difficulty; an actually-faultless vehicle part is misidentified as an abnormal part and is replaced.

Patent Document 1: JP-H7-20007A

According to the technique disclosed in Patent Document 1, however, if an ECU is configured to start up upon switch-on of an ignition switch (IG switch) and determine whether an abnormality occurs in a volatile memory, the detachment and attachment of the battery during OFF of the ignition switch leads to, after the switch-on of the IG switch, a determination that the abnormality has occurred in the volatile memory, and the ECU initializes the volatile memory and records a memory initialization code. Thus, even if the memory initialization code is stored, it is impossible to determine whether the initialization of the volatile memory is caused by the abnormality of the volatile memory or caused by the detachment and attachment of the battery. Note that if the initialization is caused by the detachment and attachment of the battery, it should be determined that the data stored in the volatile memory is reliable because the initialization is not caused by a memory abnormality. Hereinafter, the initialization of the volatile memory caused by the detachment and attachment of the battery is also referred to as a battery detachment abnormality. An abnormality in a volatile memory is also referred to as a memory abnormality.

As can be seen from the above, when the memory initialization code is stored, it is necessary to consider a possibility of an occurrence of the memory abnormality even if this initialization of the volatile memory is actually caused by the detachment and attachment of the on-board battery. Therefore, the reliability of the date stored in the volatile memory cannot be determined.

SUMMARY OF THE INVENTION

The present invention is made in view of the foregoing. It is an objective of the present invention to provide a technique that enables an appropriate determination as to reliability of data stored in a volatile memory in a vehicle communication system having multiple electronic control units, which are mounted to a vehicle and are connected with each other via network for data transmission.

According to an aspect of the present invention, a vehicle communication system includes multiple electronic control units mounted to a vehicle and connected with each other to enable data transmission therebetween via a network. One of the multiple electronic control units is a master unit, which is a master of the multiple electronic control units. The others of the multiple electronic control units are multiple slave units. The master unit is configured to distribute a vehicle common information element to the multiple slave units via the network each time a preset condition for distributing the vehicle common information element is satisfied. The vehicle common information element includes information to be commonly utilized in the multiple electronic control units. Each of the slave units includes: a common information storage medium configured to store the vehicle common information element distributed from the master unit; a memory abnormality determination section configured to determine whether an abnormality occurs in the common information storage medium; an initialization section configured to perform initialization of the common information storage medium when the memory abnormality determination section determines that the abnormality occurs in the common information storage medium; and a slave side vehicle common information transmission section configured to transmit the vehicle common information element stored in the common information storage medium of the each of the slave units. The multiple slave units comprise a group of slave units predefined as volatile memory slave units in each of which the common information storage medium is a volatile memory, which maintains data by power supplied from a battery mounted to the vehicle. If the master unit receives the common information elements from all of the volatile memory slave units, and if at least one of the received common information elements has an initialized initial value, which is a value to be set when the initialization is performed by the initialization section, and if not all of the received common information elements has the initialized initial value, the master unit determines that an abnormality other than a battery detachment abnormality has occurred in the common information storage medium of the volatile memory slave unit in which the common information element has the initialized initial value. The battery detachment abnormality is caused by detachment and attachment of the battery.

According to the above vehicle communication system, an appropriate determination as to reliability of data stored in the volatile memory becomes possible.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF EMBODIMENTS

Embodiments will be described with reference to the accompanying drawings.

Figure 1:
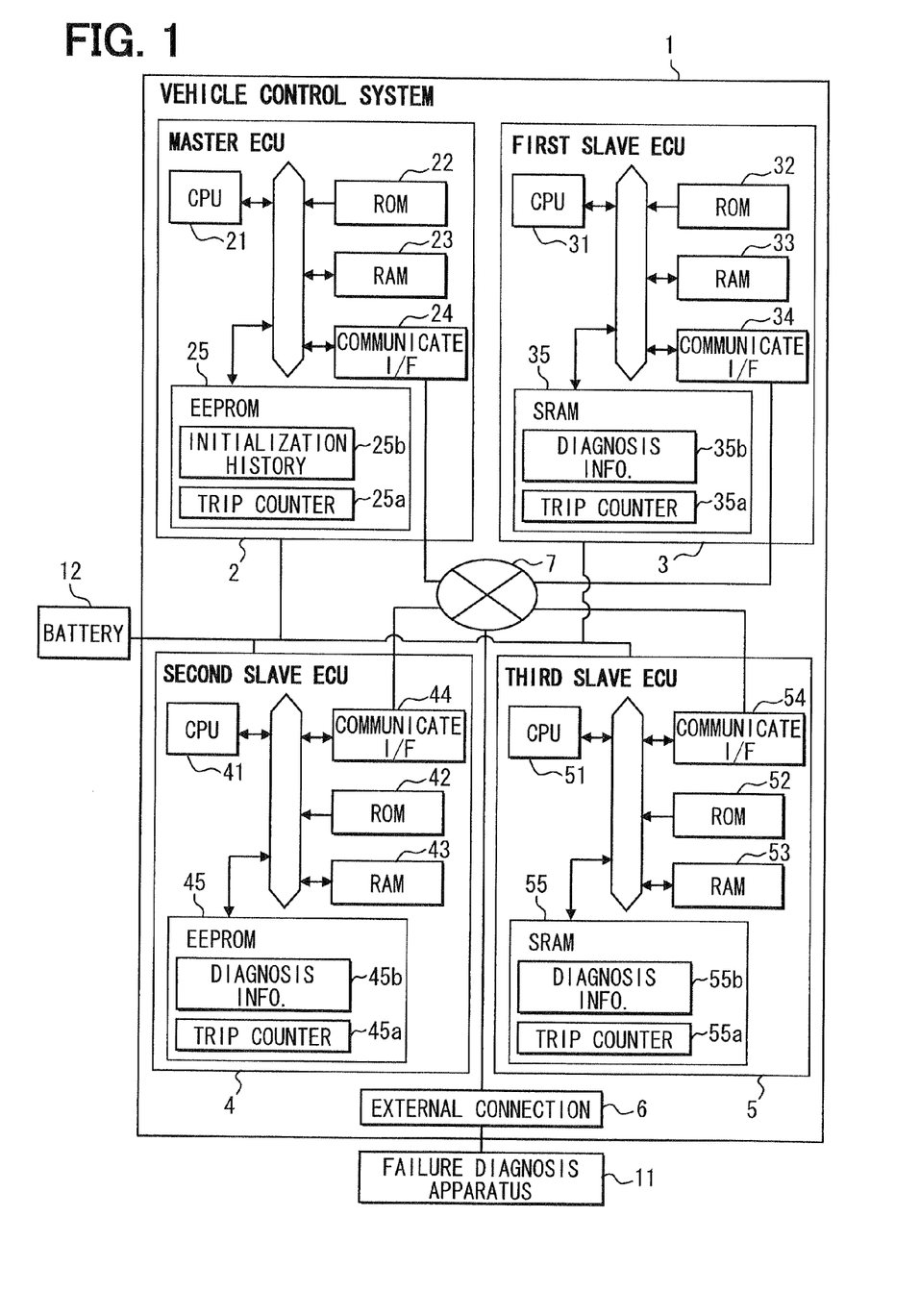
FIG. 1 is a block diagram illustrating a configuration of a vehicle control system.

FIG. 1 is a block diagram illustrating a configuration of a vehicle control system 1 of one embodiment. The vehicle control system 1 is mounted to a vehicle and includes a master ECU 2, a first slave ECU 3, a second slave ECU 4, a third slave ECU 5, an external connection device 6, and an in-vehicle LAN 7. In the present disclosure, a master ECU is also called a primary ECU, and a slave ECU is also called a secondary ECU. The master ECU 2 is one of multiple ECUs, 2, 3, 4, 5 in the vehicle control system 1 and is a master of the multiple ECUs 2, 3, 4, 5. The slave ECUs 3, 4, 5 is the others of the multiple ECUs 2, 3, 4, 5.

The master ECU 2 includes a central processing unit (CPU) 21 for performing processing based on a predetermined processing program, a read-only memory (ROM) 22 for storing various processing programs, a random access memory (RAM) 23 for storing various data, a communication interface (I/F) 24 for connecting the CPU 21 and the in-vehicle LAN 7, and an electrically erasable programmable read-only memory (EEPROM) 25 capable of maintaining data even when not powered. That is, the EEPROM 25 can act as a non-volatile memory.

The first slave ECU 3 includes a CPU 31, a ROM 32, a RAM 33, a communication I/F 34, and a static random access memory (SRAM) 35. The SRAM 35 is a volatile memory to which voltage is continuously supplied from a battery 12 of the vehicle.

The second slave ECU 4 includes a CPU 41, a ROM 42, a RAM 43, a communication I/F 44, and an EEPROM 45.

The third slave ECU 5 includes a CPU 51, a ROM 52, a RAM 53, a communication I/F 54, and a SRAM 55.

The external connection device 6 is connected with the in-vehicle LAN 7, so that a failure diagnosis apparatus (what is called a diagnostic tester) 11 is connectable with the ECUs 2 to 5 via the in-vehicle LAN 7 to enable data communication.

The EEPROM 25, the SRAM 35, the EEPROM 45 and the SRAM 55 include trip counters 25a, 35a, 45a and 55a, respectively. A time period from switch-on of an ignition switch of the vehicle to switch-off of the ignition switch, or a time period from switch-on of the ignition switch to next switch-on of the ignition switch is referred to as a trip time period. Every time the ignition switch is switched on, each trip counter is incremented.

The EEPROM 25 has an initialization history storage area 25b for storing a history of initialization. The SRAM 35, the EEPROM 45 and the SRAM 55 have diagnosis information storage areas 35b, 45b and 55b for storing vehicle diagnosis information (also referred to as diagnosis code), respectively.

In this vehicle control system 1, if the memory of the slave ECU 3, 4, 5 is initialized, the master ECU 2 performs a master side initialization record process to determine a causes of the initialization and record a determination result.

The slave ECUs 3, 4, 5 perform slave side abnormality detection processes to detect abnormalities of the SRAM 35, the EEPROM 45 and the SRAM 55, respectively.

Figure 2:
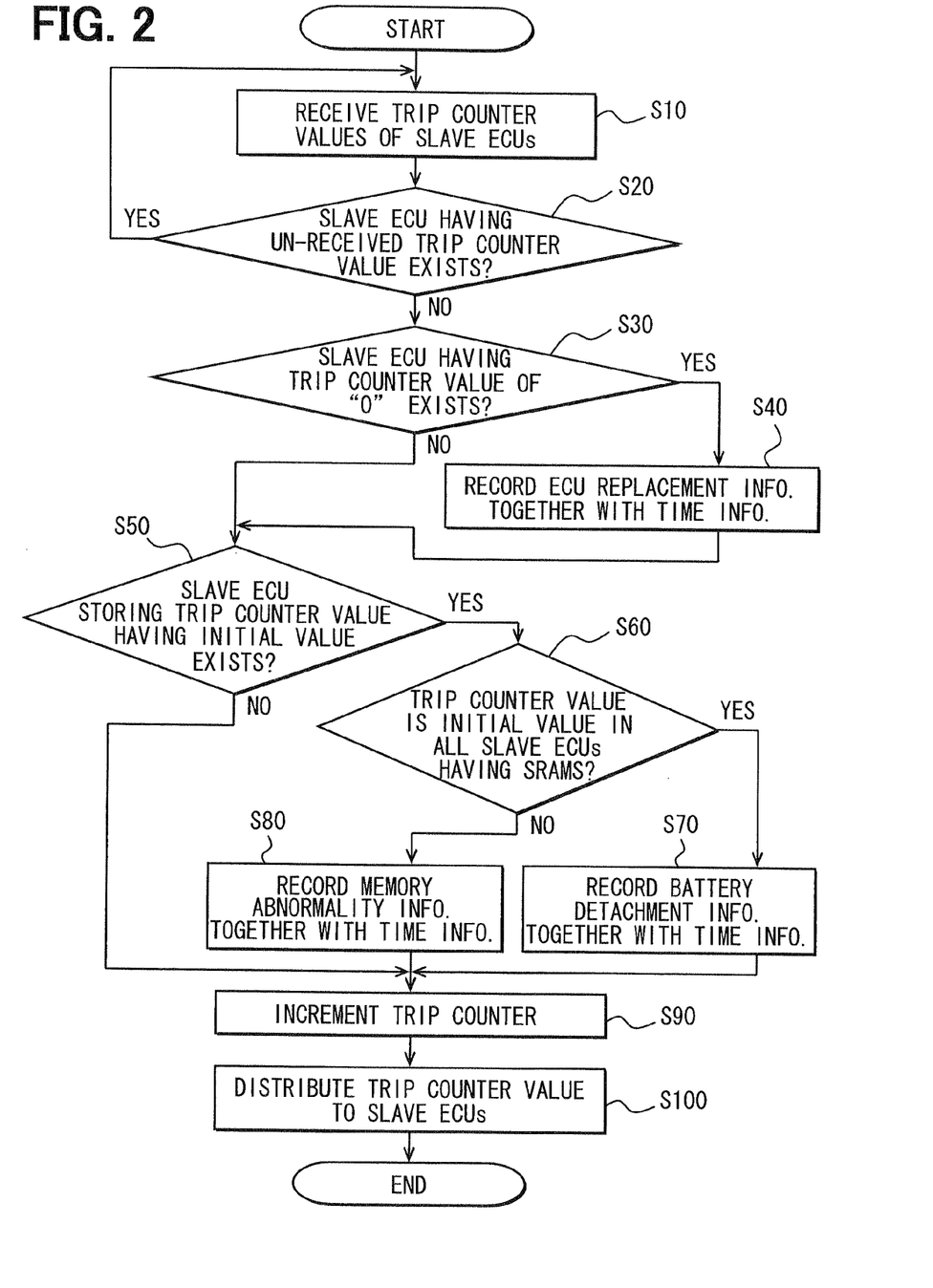
FIG. 2 is a flowchart illustrating a master side initialization record process.

First, a procedure of the master side initialization record process, which is performed by the CPU 21 of the master ECU 2, will be described with reference to FIG. 2. FIG. 2 is a flowchart illustrating the master side initialization record process. Upon starting up in response to the switch-on of the ignition switch, the CPU 21 performs the master side initialization record process one time.

In performing the master side initialization process, at S10, the CPU 21 receives values of the trip counters 35a, 45a, 55a (also referred to as trip counter values), which are transmitted from the slave ECUs 3, 4, 5 at the below-described S250.

At S20, the CPU 21 determines whether there is a slave ECU from which the CPU 21 has not received the trip counter value yet.

When the CPU 21 determines that there is a slave ECU from which the CPU 21 has not received the trip counter value, corresponding to "YES" at S20, the process returns to S10 to re-perform S10. When the CPU 21 determines that the CPU 21 has received the trip counter values from all of the slave ECUs 3, 4, 5, corresponding to "NO" at S20, the process proceeds to S30. At S30, the CPU 21 determines whether at least one of the slave ECUs 3, 4, 5 has the trip counter value of "0". When the CPU 21 determines that no slave ECU has the trip value of "0", corresponding to "NO" at S30, the process proceeds to S50.

Figure 4:
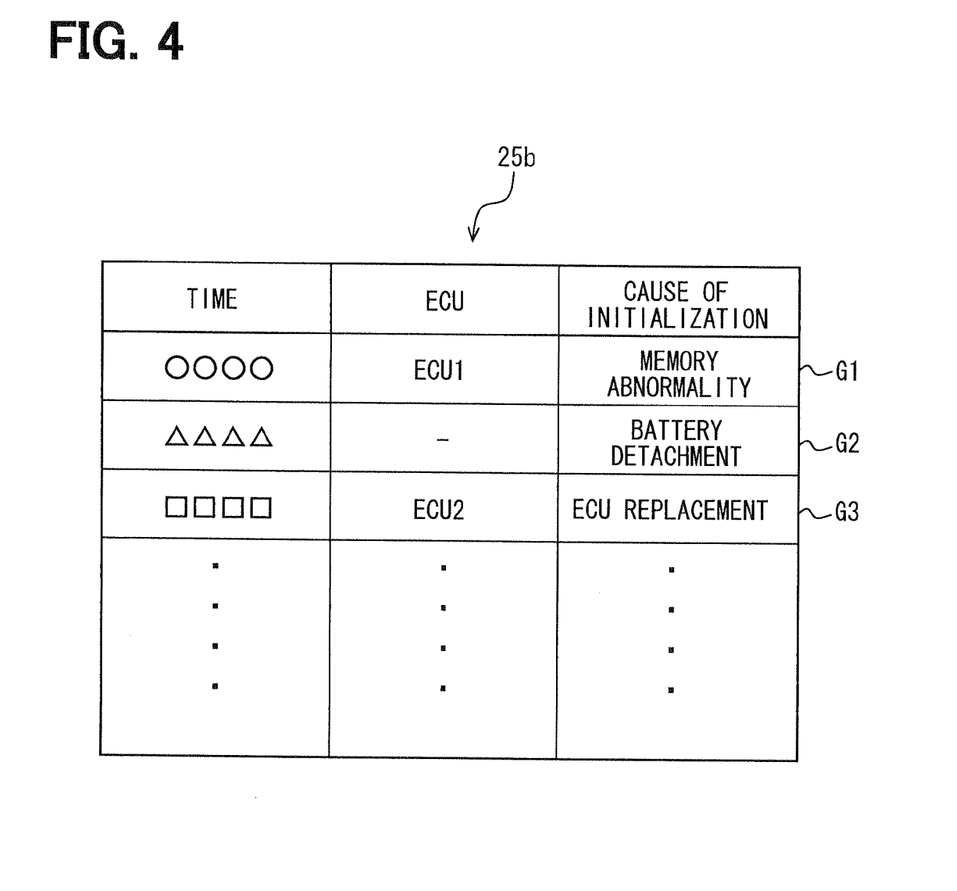
FIG. 4 is a diagram illustrating a configuration of an initialization history storage area.

When the CPU 21 determines that there is a slave ECU that has the trip value of "0", corresponding to "YES" at S30, the process proceeds to S40. At S40, the CPU 21 records ECU replacement information together with present time information indicating the present time in the initialization history storage area 25b (see FIG. 4, row "G3"), and the process proceeds to S50. In the above, the ECU replacement information indicates that the slave ECU has been replaced with the slave ECU having the trip counter value of "0".

At S50, the CPU 21 determines whether there is a slave ECU in which the trip counter value is an initial value (e.g., 0xFF). In the above, the initial value is a value that is to be set upon the initialization of the memory (e.g., SRAM 35, EEPROM 45, SRAM 55) of the slave ECU. When the CPU 21 determines that there is no slave ECU in which the trip counter value is the initial value, corresponding to "NO" at S50, the process proceeds to S90. When the CPU 21 determines that there is a slave ECU in which the trip counter value is the initial value, corresponding to "YES" at S50, the process proceeds to S60. At S60, the CPU 21 determines whether the trip counter value is the initial value in all of slave ECUs that have the SRAMs (i.e., the slave ECUs 3 and 5).

When the CPU 21 determines that the trip counter value is the initial value in all of slave ECUs that have therein the SRAMs, corresponding to "YES" at S60, the process proceeds to S70. At S70, the CPU 21 records battery detachment information together with present time information indicating the present time in the initialization history storage area 25b, and the process proceeds to S90. In the above, the battery detachment information indicates that the battery 12 has been detached and attached.

When the CPU 21 determines that, in at least one of the slave ECUs having therein the SRAMs, the trip counter value is not the initial value, corresponding to "NO" at S60, the process proceeds to S80. At S80, the CPU 21 records memory abnormality information together with present time information indicating the present time in the initialization history storage area 25b, and the process proceeds to S90. In the above, the memory abnormality information indicates that a memory abnormality (abnormality other than a battery detachment abnormality) has occurred in the slave ECU in which the trip counter value is the initial value.

At S90, the CPU 21 increments the trip counter 25a. At S100, the CPU 21 transmits the trip counter value of the trip counter 25a to the slave ECUs 3, 4, 5 via the in-vehicle LAN 7. Then, the master side initialization record process is ended.

Figure 3:
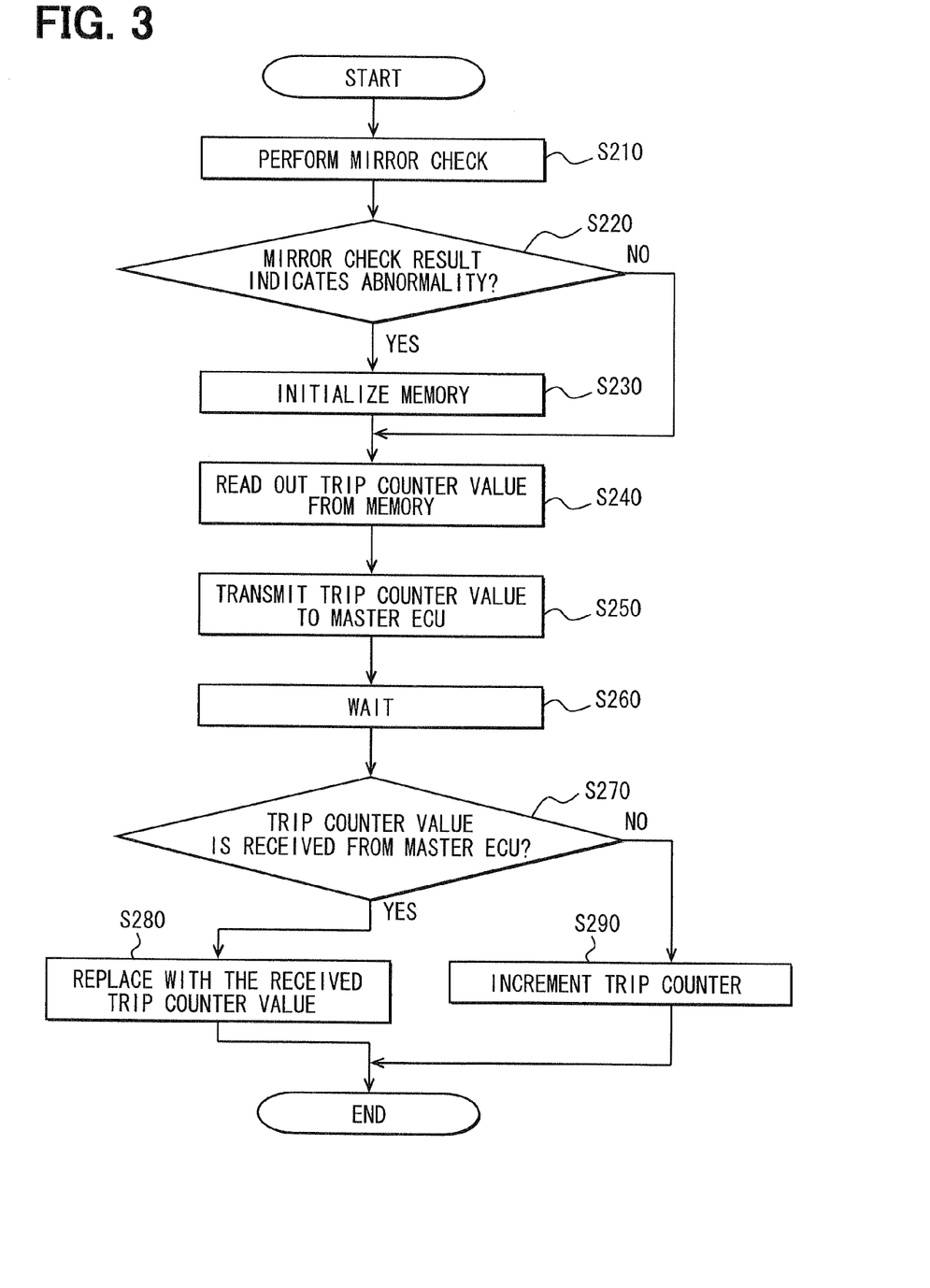
FIG. 3 is a flowchart illustrating a slave side abnormality detection process.

Next, a procedure of the slave side abnormality detection process, which can be performed by each of the CPUs 31, 41, 51 of the slave ECUs 3, 4, 5, will be described with reference to FIG. 3. FIG. 3 is a flowchart illustrating the slave side abnormality detection process. Upon the starting up in response to the switch-on of the ignition switch, the CPU 31, 41, 51 performs the slave side abnormality detection process one time.

In performing the slave side abnormality detection process, at S210, the CPU 31 (41, 51) performs mirror check of the SRAM 35 (EEPROM 45, SRAM 55). This mirror check is a way to check the reliability of stored data based on whether a logical invert relationship is maintained between stored regular data and stored mirror data. It should be noted that the mirror data is logical inverted data of the regular data.

At S220, the CPU 31 (41, 51) determines based on the mirror check whether the SRAM 35 (EEPROM 45, SRAM 55) has an abnormality. When it is determined based on the mirror check that the SRAM 35 (EEPROM 45, SRAM 55) does not have an abnormality, corresponding to "NO" at S220, the process proceeds to S240. When it is determined based on the mirror check that the SRAM 35 (EEPROM 45, SRAM 55) has an abnormality, corresponding to "YES" at S220, the process proceeds to S230. At S230, the CPU 31 (41, 51) performs initialization of the SRAM 35 (EEPROM 45, SRAM 55), and the process proceeds to S240. In the above initialization at S230, the trip counter 35a (45a, 55a) is also initialized.

At S240, the CPU 31 (41, 51) reads the trip counter value of the trip counter 35a (45a, 55a) from the SRAM 35 (EEPROM 45, SRAM 55). At S250, the CPU 31 (41, 51) transmits this trip counter value to the master ECU 2, and then at S260, the CPU 31 (41, 51) waits a predetermined time period (e.g., 1 second), which is preset.

At S270, the CPU 31 (41, 51) determines whether the CPU 31 (41, 51) has received the trip counter value from the master ECU 2. When it is determined that the CPU 31 (41, 51) has received the trip counter value from the master ECU 2, corresponding to "YES" at S270, the process proceeds to S280. At S280, the CPU 31 (41, 51) replaces the trip counter value of the trip counter 35a (45a, 55a) with the received trip counter value. When it is determined that the CPU 31 (41, 51) has not received the trip counter value from the master ECU 2, corresponding to "NO" at S270, the process proceeds to S290. At S290, the CPU 31 (41, 51) increments the trip counter 35a (45a, 55a). Then, the slave side abnormality detection process is ended.

Figure 5:
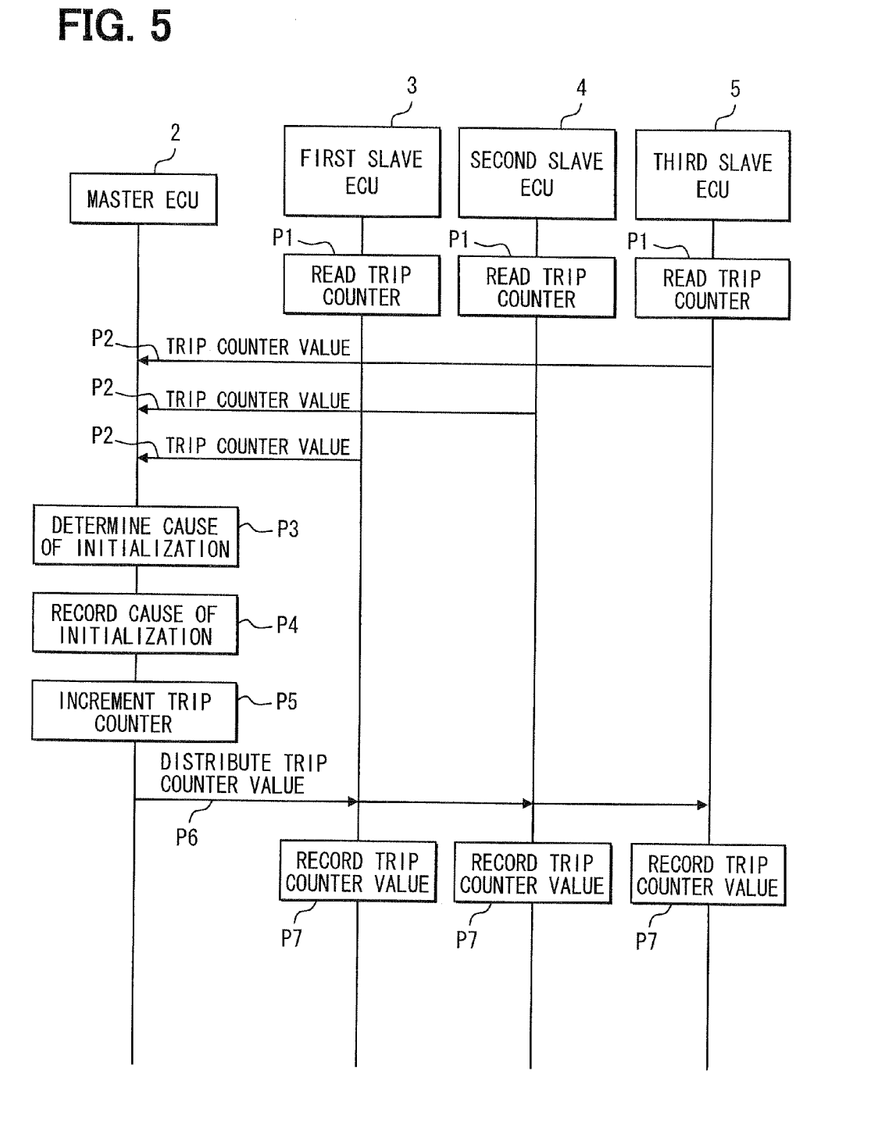
FIG. 5 is a sequence diagram illustrating an operation of a vehicle control system.

An operation of the vehicle control system 1 will be described below with reference to FIG. 5. FIG. 5 is a sequence diagram illustrating an operation of the vehicle control system 1. As shown in FIG. 5, when starting up in response to the switch-on of the ignition switch, the slave ECUs 3, 4, 5 read the trip counters 35a, 45a, 55a, respectively (see P1 in FIG. 5). At P2, the slave ECUs 3, 4, 5 transmit the trip counter values to the master ECU 2.

At P3, based on the trip counter values received from the slave ECUs 3, 4, 5, the master ECU 2 determines whether at least one of the slave ECUs 3, 4, 5 has been initialized, and determines a causes of the initialization when at least one of the slaves ECU 3, 4, 5 has been initialized. At P4, the master ECU 2 records the cause of the initialization. At P5, the master ECU 2 increments the trip counter 25a, and distributes the trip counter value of the trip counter 25a to the slave ECUs 3, 4, 5.

At P7, in response to receiving the trip counter value from the master ECU 2, the slave ECUs 3, 4, 5 replace the trip counter values of the trip counters 35a, 45a, 55a with the received trip counter value.

Figure 6:
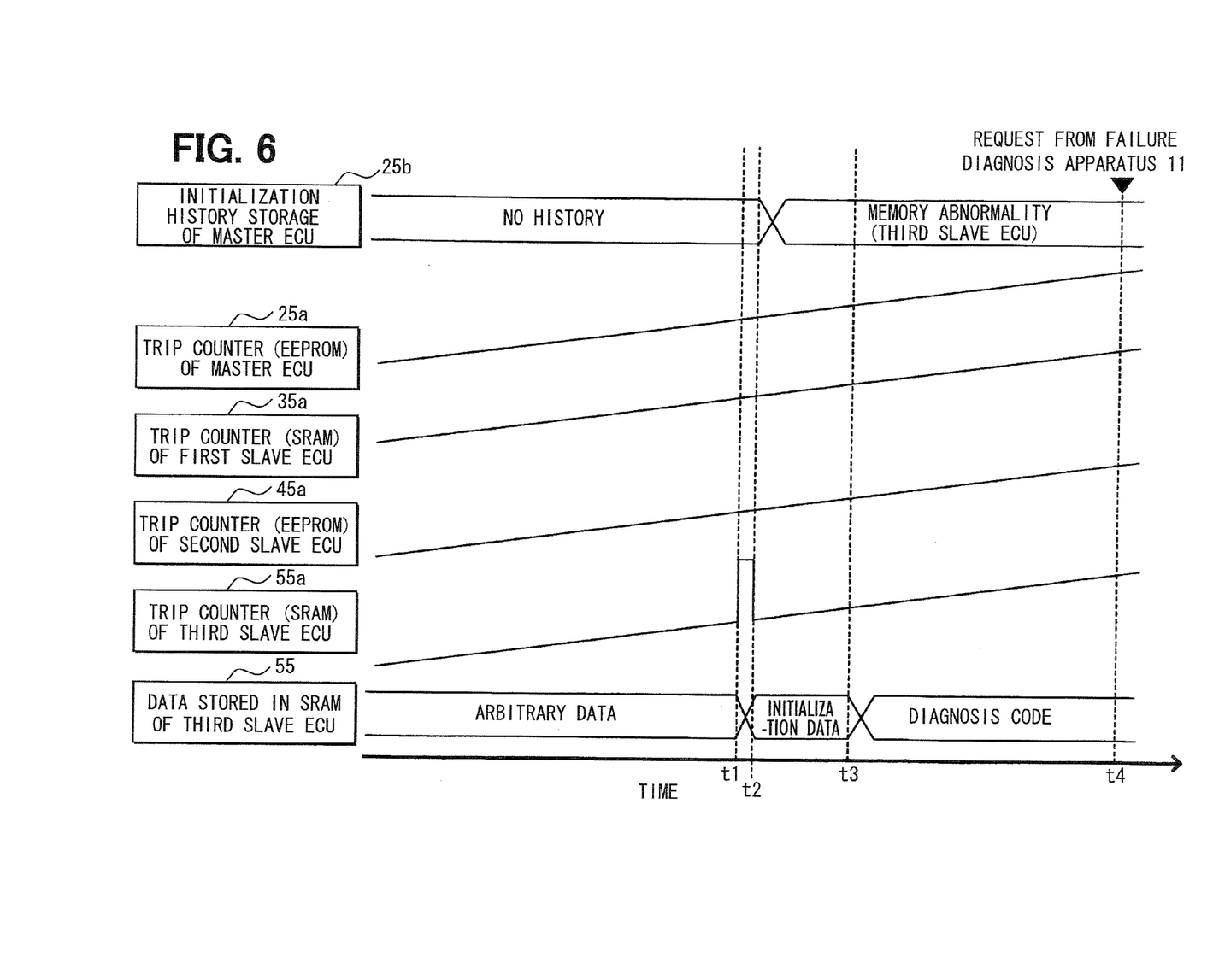
FIG. 6 is a timing chart illustrating an operation in a case of an occurrence of a memory abnormality.

Next, an operation of the vehicle control system 1 in a case of an occurrence of a memory abnormality in a slave ECU will be described with reference to FIG. 6. FIG. 6 is a timing chart illustrating an operation in a case of an occurrence of a memory abnormality in a slave ECU.

In FIG. 6, the trip counter 25a, 35a, 45a is incremented every time the ignition switch is turned on, although FIG. 6 is depicted for simplification as if each trip counter 25a, 35a, 45a, 55a is incremented in proportion to time elapsed.

If a memory abnormality occurs in the SRAM 55 of the third slave ECU 5, the memory abnormality is detected by the mirror check, and the SRAM 55 is initialized (see "t1" in FIG. 6). Accordingly, the value of the trip counter 55a becomes the initial value (e.g., 0xFF), as shown by time "t1" in FIG. 6.

Then, as shown by time 12" in FIG. 6, when receiving the trip counter values from the slave ECUs 3, 4, 5, the master ECU 2 determines that the memory abnormality has occurred in the third slave ECU 5 because only the trip counter 55a of the third slave ECU 5 has the initial value. Further, the master ECU 2 records the memory abnormality information, which indicates the occurrence of the memory abnormality in the third slave ECU 5, in the initialization history storage area 25b. Furthermore, when receiving the trip counter value from the master ECU 2, the third slave ECU 5 replaces the value of the trip counter 55a with the receives trip counter value (see time "t2" in FIG. 6).

As shown by time "t3" in FIG. 6, if the third slave ECU 5 detects an abnormality of a sensor connected with the third slave ECU 5, the third slave ECU 5 records a diagnosis code indicating detection of the abnormality of the sensor in the SRAM 55 Then, when the failure diagnosis apparatus 11 requests the ECU 2, 3, 4, 5 to transmit a diagnosis code via the in-vehicle LAN 7, the ECU 2, 3, 4, 5 transmits the diagnosis code to the failure diagnosis apparatus 11 via the in-vehicle LAN 7, as shown by time "t4" in FIG. 6. Accordingly, the failure diagnosis apparatus 11 acquires the memory abnormality information of the master ECU 2 and the diagnosis code of the third slave ECU 5.

In this way, by using the failure diagnosis apparatus 11, a worker can check the memory diagnosis information of the master ECU 2 and the diagnosis code of the third slave ECU 5, and the worker can be aware that the memory abnormality has occurred in the third slave ECU 5. Further, the worker can determine that the diagnosis code stored in the third slave ECU 5 is not reliable.

Figure 7:
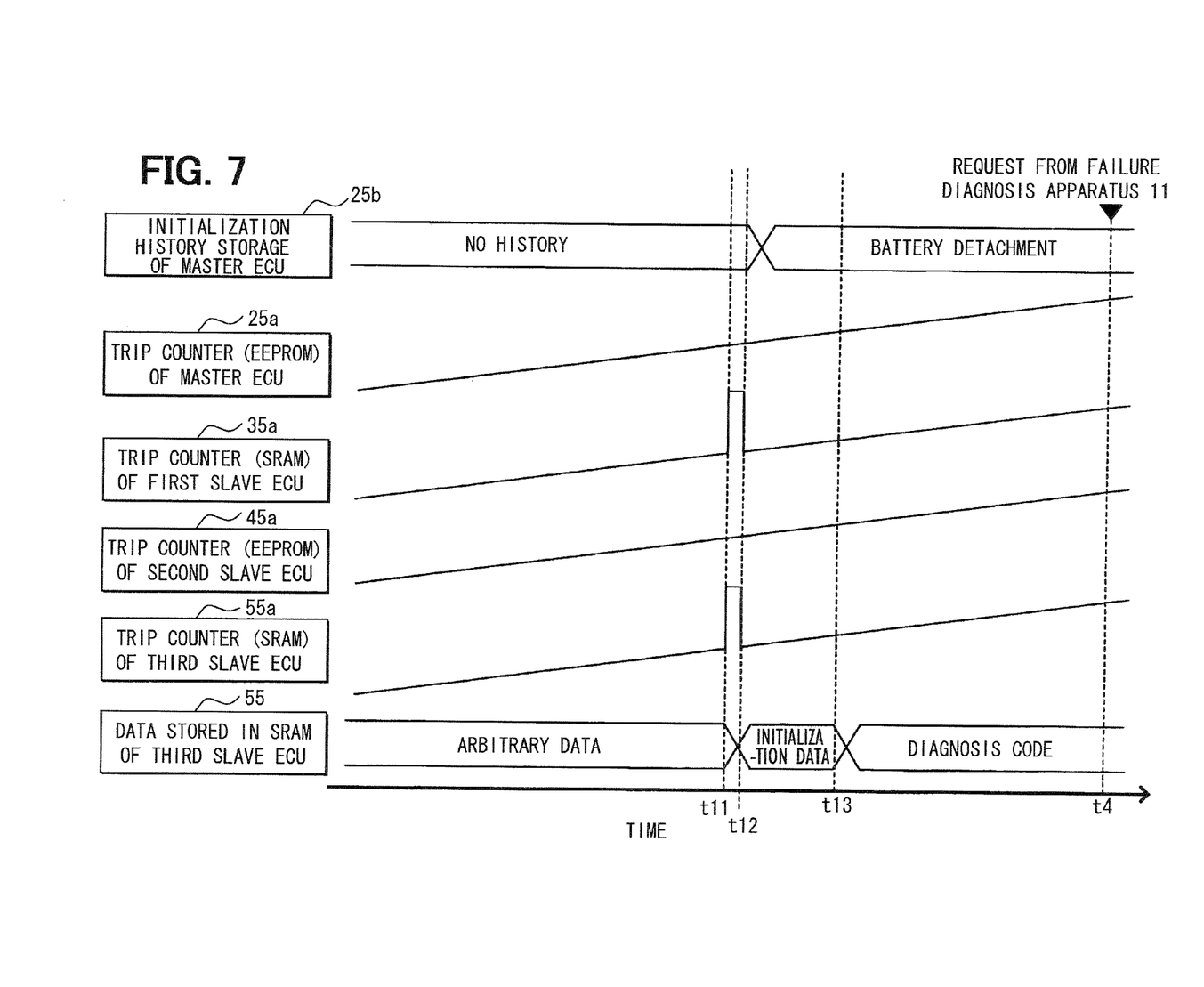
FIG. 7 is a timing chart illustrating an operation in a case of detachment and attachment of a battery.

An operation of the vehicle control system 1 in a case of detachment and attachment of the battery 12 will be described below with reference to FIG. 7. FIG. 7 is a timing chart illustrating the operation in a case of detachment and attachment of the battery 12. As shown in FIG. 7, each trip counter 25*a*, 35*a*, 45*a*, 55*a* is incremented every time the ignition switch is turned on, although FIG. 7 is depicted for simplification as if each trip counter 25*a*, 35*a*, 45*a*, 55*a* is incremented in proportion to time elapsed.

As shown by time "t11" in FIG. 7, if the battery 12 is detached and attached, the first and third slave ECUs 3, 5 detects an abnormality by the mirror check, and initializes the SRAMs 35, 55. Accordingly, the value of each trip counter 35*a*, 55*a* becomes the initial value (e.g., 0xFF), as shown by time "t11" in FIG. 7.

Then, when receiving the trip counter values from the slave ECUs 3, 4, 5, the master ECU 2 determines, because the trip counter value is the initial value in all of the slave ECUs having therein the SRAM, that the battery 12 is detached and attached. And the master ECU 2 records battery detachment information indicating the detachment and attachment of the battery 12 in the initialization history storage area 25*b*, as shown by time "t12" in FIG. 7. Furthermore, as shown by time "t12" in FIG. 7, when receiving the trip counter value from the master ECU 2, the first and third slave ECUs 3, 5 replace the values of the trip counters 35*a*, 55*a* with the received trip counter value.

As shown by time "t13" in FIG. 7, if the third slave ECU 5 detects an abnormality of a sensor connected with the third slave ECU 5, the third slave ECU 5 records a diagnosis code indicating detection of the abnormality of the sensor in the SRAM 55. Then, if the failure diagnosis apparatus 11 requests the ECUs 2, 3, 4, 5 to transmit a diagnosis code via the in-vehicle LAN 7, the ECUs 2, 3, 4, 5 transmit the diagnosis code to the failure diagnosis apparatus 11 via the in-vehicle LAN 7, as shown by time "t14" in FIG. 7. Accordingly, the failure diagnosis apparatus 11 acquires the battery detachment information of the master ECU 2 and the diagnosis code of the third slave ECU 5.

In this way, by using the failure diagnosis apparatus 11, a worker can check the battery detachment information of the master ECU 2 and the diagnosis code of the third slave ECU 5. Thus, the worker can be aware that the memory abnormality has not occurred in the third slave ECU 5. Further, the worker can determine that the diagnosis code stored in the third slave ECU 5 is reliable.

Figure 8:
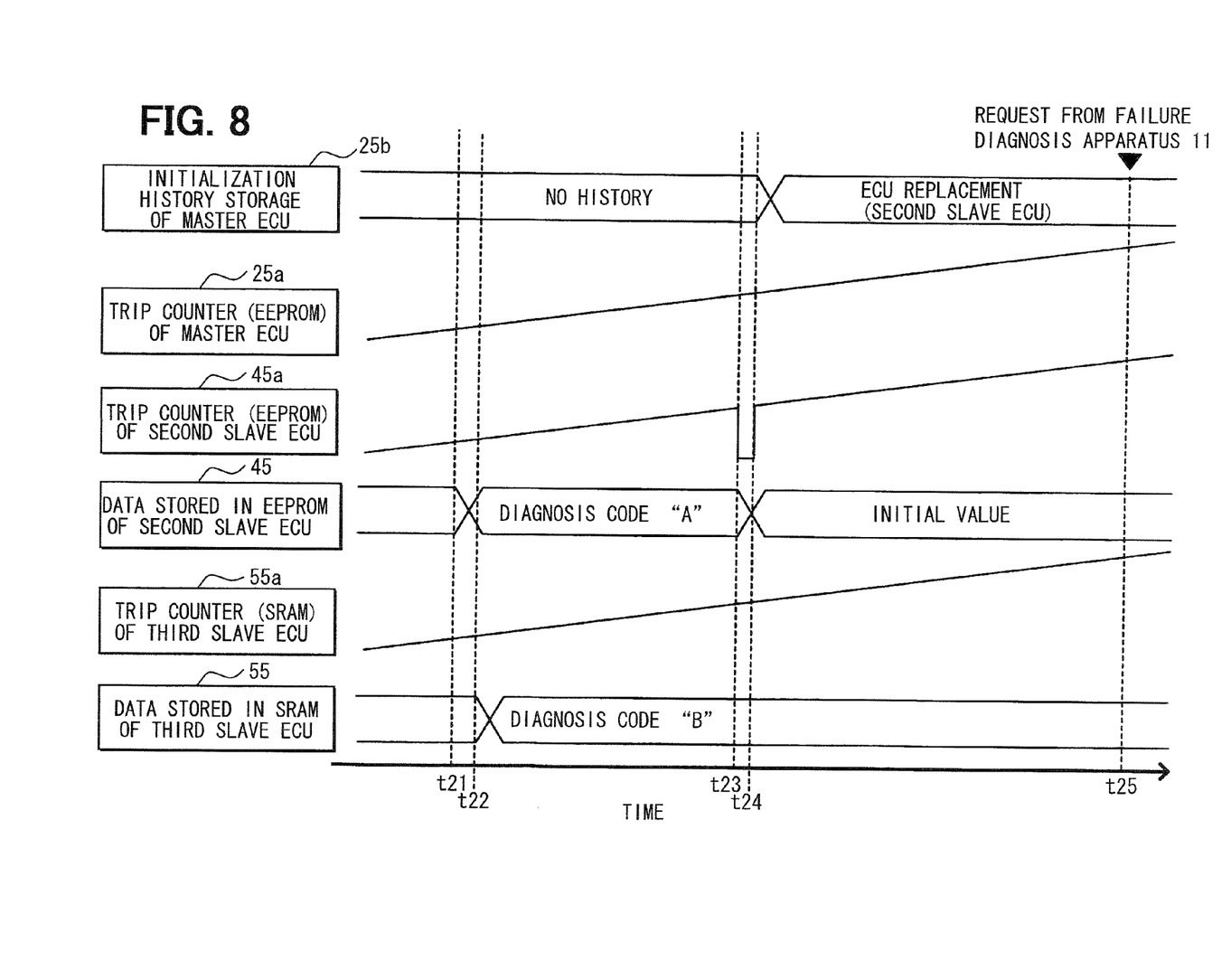
FIG. 8 is a timing chart illustrating an operation in a case of replacement of a slave ECU.

Next, an operation of the vehicle control system 1 in a case of replacement of the second slave ECU 4 will be described with reference to FIG. 8. FIG. 8 is a timing chart illustrating an operation in a case of replacement of the second slave ECU 4.

As shown in FIG. 8, each trip counter 25*a*, 45*a*, 55*a* is incremented every time the ignition switch is turned on, although FIG. 8 is depicted for simplification as if each trip counter 25*a*, 45*a*, 55*a* is incremented in proportion to time elapsed.

As shown by time "t21" in FIG. 8, if the second slave ECU 4 detects an abnormality of a sensor connected with the second slave ECU 4, the second slave ECU 4 records a diagnosis code indicating detection of the abnormality of the sensor in the EEPROM 45. Further, if the abnormality of the sensor connected with the second slave ECU 4 causes an abnormality of a sensor connected with the third slave ECU 5, the third slave ECU 5 records in the SRAM 55 a diagnosis code indicating that the abnormality has occurred in the sensor connected with the third slave ECU 5, as shown by time "t22" in FIG. 8.

Then, if the second slave ECU 4 is replaced, the value of the trip counter 45*a* becomes "0", as shown by time "t23" in FIG. 8. In addition, the data stored in the EEPROM 45 becomes an initial value, as shown by time "t23" in FIG. 8.

Then, as shown by time "t24" in FIG. 8, when receiving the trip counter values from the slave ECUs 3, 4, 5, the master ECU 2 determines, because the value of the trip counter 45*a* of the second slave ECU 4 is "0", that the second slave ECU 4 has been replaced, and the master ECU 2 records ECU replacement information in the initialization, history storage area 25*b*. In the above, the ECU replacement information indicates that the second slave ECU 4 has been replaced. Further, as shown by time "t24" in FIG. 8, when receiving the trip counter value from the master ECU 2, the second slave ECU 4 replaces the value of the trip counter 45*a* with the received trip counter value.

Then, if the failure diagnosis apparatus 11 requests, via the in-vehicle LAN 7, the ECU 2, 3, 4, 5 to transmit a diagnosis code, the ECUs 2, 3, 4, 5 transmit the diagnosis code to the failure diagnosis apparatus 11 via the in-vehicle LAN 7, as shown by time "t25" in FIG. 8. Accordingly, the failure diagnosis apparatus 11 acquires the ECU replacement information of the master ECU 2 and the diagnosis code of the third slave ECU 5.

In this way, it is possible to prevent wrong displacement of the third slave ECU 3. More specifically, in the above example, since the abnormality of the sensor connected with the second slave ECU 4 causes the abnormality of the sensor connected with the third slave ECU 5, it is necessary to eliminate the abnormality of the sensor connected with the second slave ECU 4. However, since the second slave ECU 4 has been replaced, the diagnosis code indicating the abnormality of the sensor connected with the second slave ECU 4 is not stored in the second slave ECU 4. Thus, there is a possibility that it may be determined that a problem is not associated with the second slave ECU 4 but associated with the third slave ECU 5, and the third slave ECU 5 may be replaced. However, according to the vehicle control system 1 of the present embodiment, since the ECU replacement information can inform that the second slave ECU 4 has been replaced, it becomes possible to take into account a possibility that the abnormality of the sensor connected with the second slave ECU 4 causes the abnormality of the sensor connected with the third slave ECU 5.

In the above vehicle control system 1, the ECUs 2, 3, 4, 5 mounted to the vehicle are connected with each other via the in-vehicle LAN for enabling data transmission therebetween. The master ECU 2 distributes the trip counter value to the slave ECUs 3, 4, 5 each time the ignition switch is turned on.

In addition, the slave ECU 3 (4, 5) includes the SRAM 35 (the EEPROM 45, the SRAM 55) for storing the trip counter value distributed from the master ECU 2. The slave ECU 3 (4, 5) determines at S210 whether an abnormality occurs in the SRAM 35 (EEPROM 45, SRAM 55). When it is determined that an abnormality occurs in the SRAM 35 (EEPROM 45, SRAM 55), the slave ECU 3 (4, 5) initializes at S230 the SRAM 35 (EEPROM 45, SRAM 55). At S250, the slave ECU 3 (4, 5) transmits the trip counter value stored in the SRAM 35 (EEPROM 45, SRAM 55) to the master ECU 2.

Further, when the master ECU 2 receives the trip counter values from all of slave ECUs 3, 5 having the SRAMs, if at least one of the trip counter values received from the slave ECUs 3, 5 is the initial value (corresponding "YES" at S50) and if not all of the trip counter values received the slave ECUs 3, 5 is the initial value (corresponding to "NO" at S60), the master ECU 2 determines that an abnormality other than a battery detachment abnormality has occurred in the SRAM of the slave ECU whose trip counter value is the initial value (corresponding to S80).

If at least one of the trip counter values received from the slave ECUs 3, 5 is the initial value (corresponding YES at S50) and if all of the trip counter values received the slave ECUs 3, 5 is the initial value (corresponding to YES at S60), it is determined that the battery 12 has been detached and attached (corresponding to S70).

According to the above configuration of the vehicle communication system, it is possible to identify a slave ECU in which a memory abnormality has occurred, while distinguishing the memory abnormality from the battery detachment attachment abnormality.

Therefore, it is possible to appropriately check and determine reliability of date that has been recorded in the SRAM since the trip counter value had the initial value. For example, if it is determined that the battery detachment attachment abnormality has occurred in a SRAM, it is possible to determine that the data stored in this SRAM is reliable. If it is determined that the memory abnormality has occurred in a SRAM, it is possible to determine that the data stored in this SRAM is not reliable Further, when the master ECU 2 receives the trip counter value from the slave ECU 4 having the EEPROM 45, if the master ECU 2 determines that the received trip counter value is "0" (corresponding to "YES" at S30), the master ECU 2 determines that the slave ECU has been replaced (corresponding to S40).

Thus, it is possible to determine whether a slave ECU has been replaced, by using the trip counter value stored in the slave ECU.

If it is determined that a memory abnormality has occurred, the memory abnormality information together with the present time information are recorded (corresponding to S80).

Thus, it becomes possible to determine the time of the occurrence of the memory abnormality. For example, if memory abnormalities have occurred in multiple slave ECUs, it is possible to determine, in after-sell service, the occurrences of the memory abnormalities in the multiple slave ECUs in a chronological order. This is useful in failure analysis.

In the above embodiment, the vehicle control system 1 can correspond to a vehicle communication system. The in-vehicle LAN 7 can correspond to a network. Each of the SRAM 35, the EEPROM 45 and the SRAM 55 can correspond to a common information storage medium or means. S210, which is performed by the CPU 31, 41, 51, can correspond to a memory abnormality determination section or means. S220, which is performed by the CPU 31, 41, 51, can correspond to an initialization section or means. S250, which is performed by the CPU 31, 41, 51, can correspond to a slave side vehicle common information transmission section or means. S50 to S80, which are performed by the CPU 21, can correspond to a memory abnormality determination section or means. S30 to S40, which are performed by the CPU 21, can correspond to a replacement determination section or means. S80, which is performed by the CPU 21, can correspond to an abnormality history record section or means. The slave ECUs 3, 5 can correspond to volatile memory slave ECUs (also called a group of slave units predefined as volatile memory slave units). The slave ECU 4 can correspond to a non-volatile memory slave ECU (also called a slave unit predefined as a non-volatile memory slave unit).

The trip counter value can correspond to a vehicle common information element including information to be commonly utilized in multiple ECUs. The switching-on of the ignition switch can correspond to a preset condition for distributing a vehicle common information element. The initial value of the trip counter value used in making a determination at S50, S60 can correspond to an initialization initial value. The value ("0" in the above embodiment) of the trip counter value used in making a determination at S30 can correspond to a replacement initial value, which may be a value that is preset before shipment of the common information storage medium of the non-volatile memory slave unit, and that is other than the initialized initial value. The present time information recorded together with abnormality occurrence information (e.g., diagnosis code) can correspond to time information indicating a time corresponding to an occurrence of an abnormality Embodiments of the present invention are not limited to the above-described embodiments, and can have various forms. For example, although the trip counter value is used as a vehicle common information element in the above embodiment, other values such as travel distance of the vehicle, time and the like may be used as a vehicle common information element.

According to an example of the present disclosure, the following vehicle communication system may be provided. The vehicle communication system includes multiple electronic control units mounted to a vehicle and connected with each other to enable data transmission therebetween via a network. One of the multiple electronic control units is a master unit, which is a master of the multiple electronic control units. The others of the multiple electronic control units are multiple slave units. The master unit is configured to distribute a vehicle common information element to the multiple slave units via the network each time a preset condition for distributing the vehicle common information element is satisfied. The vehicle common information element includes information to be commonly utilized in the multiple electronic control units. Each of the slave units includes: a common information storage medium configured to store the vehicle common information element distributed from the master unit; a memory abnormality determination section configured to determine whether an abnormality occurs in the common information storage medium; an initialization section configured to perform initialization of the common information storage medium when the memory abnormality determination section determines that the abnormality occurs in the common information storage medium; and a slave side vehicle common information transmission section configured to transmit the vehicle common information element stored in the common information storage medium of the each of the slave units. The multiple slave units comprise a group of slave units predefined as volatile memory slave units in each of which the common information storage medium is a volatile memory, which maintains data by power supplied from a battery mounted to the vehicle. If the master unit receives the common information elements from all of the volatile memory slave units, and if at least one of the received common information elements has an initialized initial value and if not all of the received common information elements has the initialized initial value, the master unit determines that an abnormality other than a battery detachment abnormality has occurred in the common information storage medium of the volatile memory slave unit in which the common information element has the initialized initial value. In the above, the initialized initial value a value to be set when the initialization is performed by the initialization section. The battery detachment abnormality is caused by detachment and attachment of the battery.

In connection with the above vehicle communication system, it should be noted that if the battery of the vehicle is detached from the vehicle, the supply of power from the battery disappears. Thus, the detachment of the battery of the vehicle can cause the following; in all of the volatile memory slave units (in which the volatile memory acting as the common information storage medium maintains its data by being powered from the battery), the memory abnormality determination section determines that the abnormality has occurred in the common information storage medium, and the initialization section performs the initialization of the common information storage medium. As a result, in all of the volatile memory slave units, the vehicle common information element has the initialized initial value. Therefore, in cases where the vehicle common information element has the initialized initial value in not all of the volatile memory slave units but in some of the volatile memory slave units, it is possible to determine that the abnormality other than the battery detachment abnormality has occurred in the common information storage medium of the some of the volatile memory slave units.

Therefore, according to the above vehicle communication system, if the vehicle common information element has the initialized initial value in a volatile memory slave unit, it is possible to identify a volatile memory slave unit in which the abnormality other than the battery detachment abnormality has occurred, while distinguishing the battery detachment abnormality from the abnormality other than the battery detachment abnormality.

In this way, it is possible to appropriately determine the reliability of the date that has been stored in the common information storage medium since the vehicle common information element had the initialized initial value. For example, if it is determined that the battery detachment abnormality has occurred in a common information storage medium, it is possible to determine that the data stored in this common information storage medium is reliable. If it is determined that the abnormality (e.g., memory abnormality) other than the battery detachment abnormality has occurred in a common information storage medium, it is possible to determine that the data stored in this common information storage medium is not reliable.

It may be preferable that the above-described initialized initial value be set to a value that hardly appears in a normal usage of the vehicle.

The above vehicle communication system may be configured in the following way. The multiple slave units further comprises, in addition to the volatile memory slave units, a slave unit predefined as a non-volatile memory slave unit in which the common information storage medium is a non-volatile memory. The master unit is further configured to determine, in cases where the master unit receives the vehicle common information element from the non-volatile memory slave unit and the received vehicle common information element has a replacement initial value, that the non-volatile memory slave unit has been replaced. In the above, the replacement initial value is a value that is preset before shipment of the common information storage medium of the non-volatile memory slave unit, and that is other than the initialized initial value.

According to the above configuration, it is possible to determine whether a slave unit has been replaced, by using the vehicle common information element stored in the slave unit.

The above vehicle communication system may be configured in the following way. The master unit further includes an abnormality history record section. In cases where the memory abnormality determination section determines that the abnormality other than the battery detachment abnormality has occurred, the abnormality history record section is configured to record abnormality occurrence information together with time information. In the above, the abnormality occurrence information indicates that the abnormality other than the battery detachment abnormality has occurred. The time information indicates a time corresponding to an occurrence of the abnormality other than the battery detachment abnormality.

According to the above configuration, it is possible to identify a time at which the abnormality (e.g., memory abnormality) other than the battery detachment abnormality has occurred. For example, if the memory abnormality has occurred in multiple slave units, it is possible to draw up a chronology of the occurrences of the memory abnormalities in the multiple slave units. This is useful in failure analysis.

According to another example of the present disclosure, an electronic control unit configured as a master unit in the above vehicle communication system can be provided. An electronic control unit configured as a slave unit in the above vehicle communication system can be also provided.

While the invention has been described above with reference to various embodiments thereof, it is to be understood that the invention is not limited to the above described embodiments and constructions. The invention is intended to cover various modifications and equivalent arrangements.

Further, each or any combination of processes, steps, sections or means explained in the above may be achieved as a software section or means (e.g., subroutine) and/or a hardware section or means (e.g., circuit or integrated circuit), including or not including a function of a related device; furthermore, the hardware section or means can be constructed inside of a microcomputer.

Furthermore, the software section or means or any combinations of multiple software sections or means may be included in a software program, which is contained in a computer-readable storage media or is installed in a computer via a communications network.

What is claimed is:
1. A vehicle communication system comprising:
a plurality of electronic control units that is mounted to a vehicle and connected with each other to enable data transmission therebetween via a network;
a master unit that is one of the plurality of electronic control units, and that is a master of the plurality of electronic control units; and
a plurality of slave units that is the others of the plurality of electronic control units,
wherein:
the master unit is configured to distribute a vehicle common information element to the plurality of slave units via the network each time a preset condition for distributing the vehicle common information element is satisfied, the vehicle common information element including information to be commonly utilized in the plurality of electronic control units;
each slave unit includes
a common information storage medium configured to store the vehicle common information element distributed from the master unit,
a memory abnormality determination section configured to determine whether an abnormality occurs in the common information storage medium,
an initialization section configured to perform initialization of the common information storage medium when the memory abnormality determination section determines that the abnormality occurs in the common information storage medium, and a slave side vehicle common information transmission section configured to transmit the vehicle common information element stored in the common information storage medium of the each slave unit;

the plurality of slave units comprises a group of slave units predefined as volatile memory slave units in each of which the common information storage medium is a volatile memory, which maintains data by being powered from a battery mounted to the vehicle; and the master unit is further configured to determine, in cases where
(i) the master unit receives the common information elements from all of the volatile memory slave units,
(ii) at least one of the received common information elements has an initialized initial value, which is a value to be set when the initialization is performed by the initialization section, and
(iii) not all of the received common information elements has the initialized initial value, that an abnormality other than a battery detachment abnormality has occurred in the common information storage medium of the volatile memory slave unit in which the common information element has the initialized initial value, the battery detachment abnormality being caused by detachment and attachment of the battery.

2. The vehicle communication system according to claim 1, wherein:

the plurality of slave units further comprises, in addition to the volatile memory slave units, a slave unit predefined as a non-volatile memory slave unit in which the common information storage medium is a non-volatile memory;

the master unit is further configured to determine,
in cases where the master unit receives the vehicle common information element from the non-volatile memory slave unit and the received vehicle common information element has a replacement initial value,
that the non-volatile memory slave unit has been replaced; and the replacement initial value is a value that is preset before shipment of the common information storage medium of the non-volatile memory slave unit, and that is other than the initialized initial value.

3. The vehicle communication system according to claim 1, wherein:

the master unit further includes an abnormality history record section; and in cases where the memory abnormality determination section determines that the abnormality other than the battery detachment abnormality has occurred, the abnormality history record section is configured to record abnormality occurrence information indicating that the abnormality other than the battery detachment abnormality has occurred, together with time information indicating a time corresponding to an occurrence of the abnormality other than the battery detachment abnormality.

4. An electronic control unit configured as a master unit in a vehicle communication system recited in claim 1.

5. An electronic control unit configured as a slave unit in a vehicle communication system recited in claim 1.

* * * * *